Oct. 13, 1931.　　F. JOHNSON ET AL　　1,827,236
LITTER REMOVER
Filed Aug. 12, 1927　　3 Sheets-Sheet 3
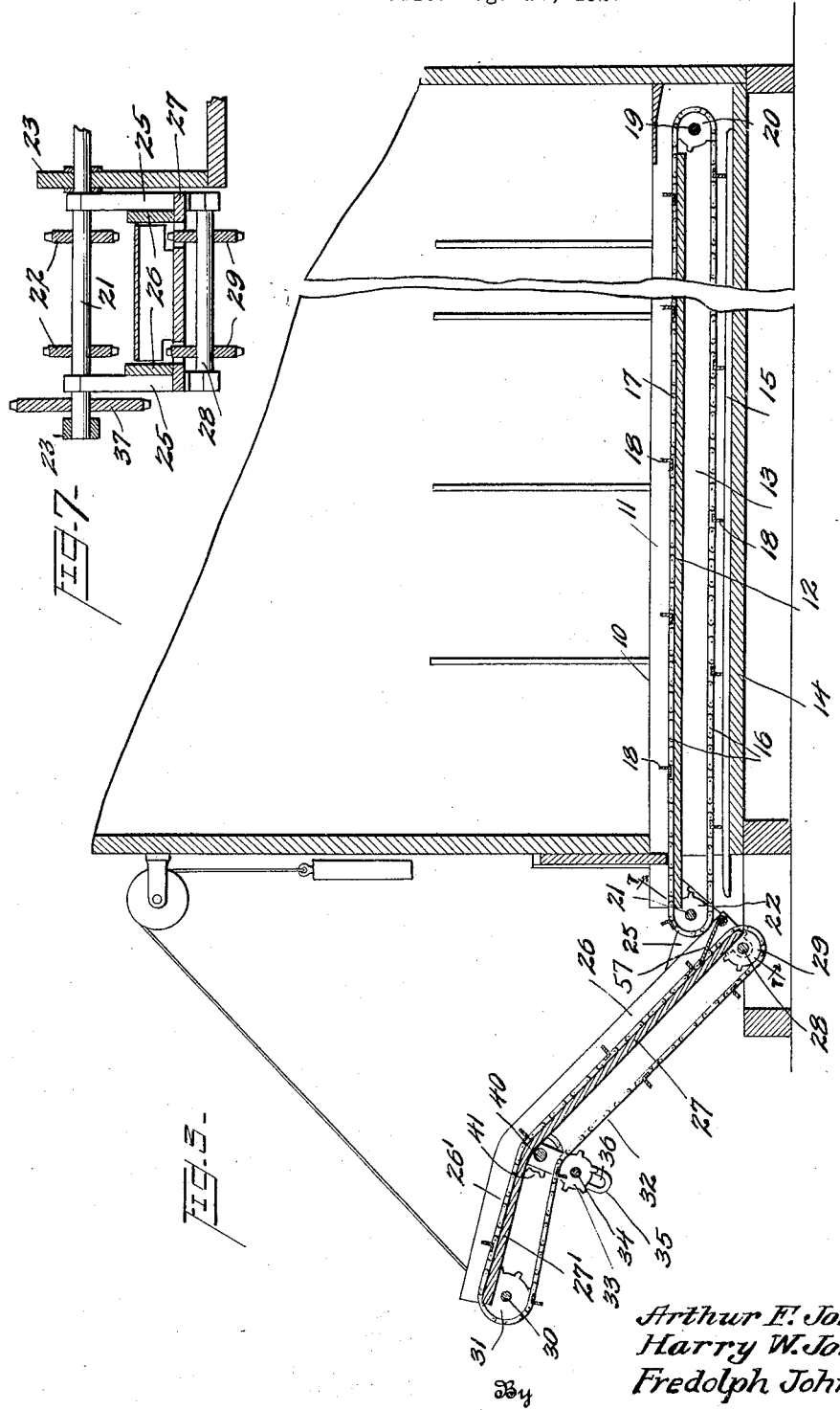
Inventors
Arthur F. Johnson
Harry W. Johnson
Fredolph Johnson
By Walter W. Burns
Attorney Patented Oct. 13, 1931

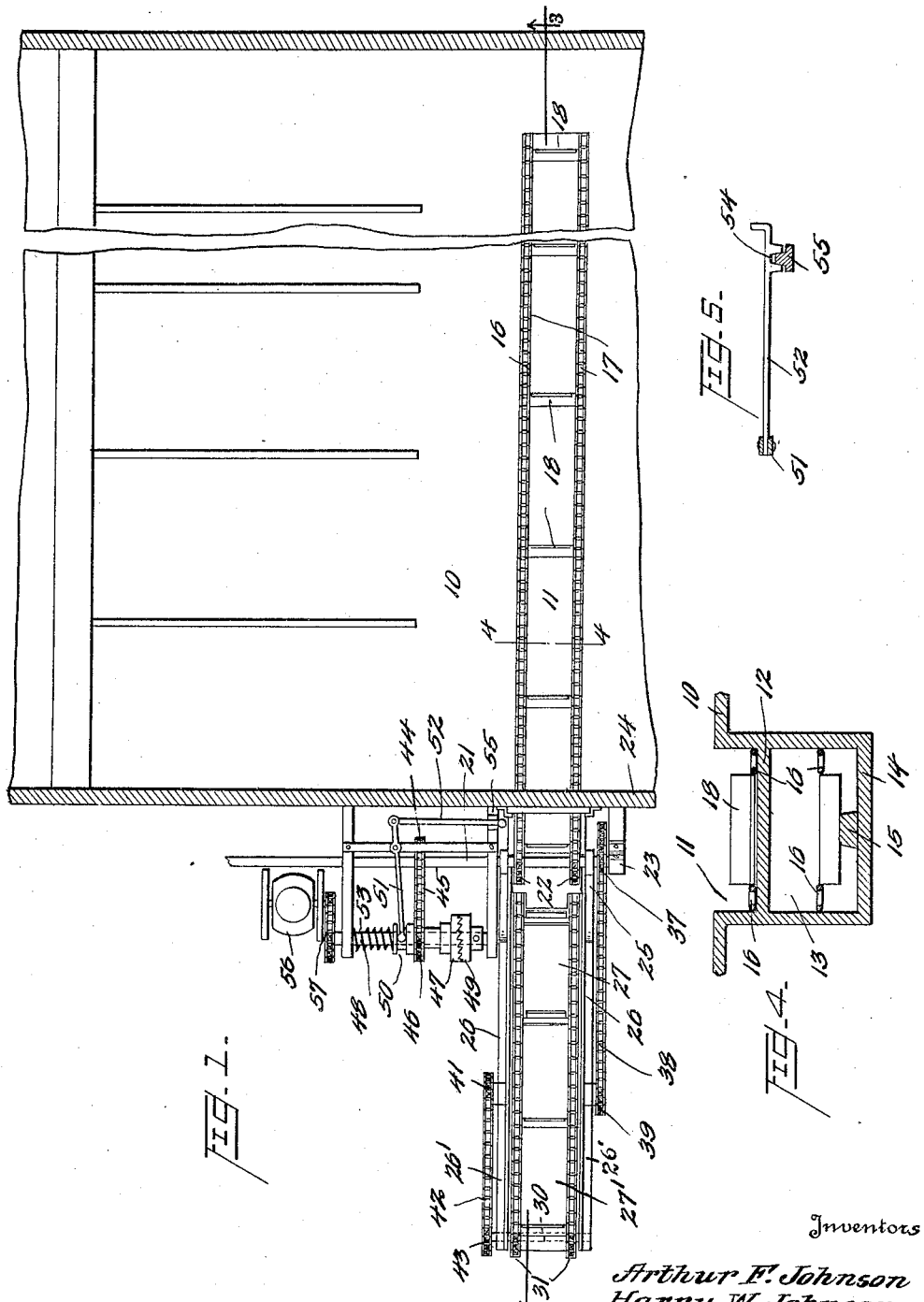

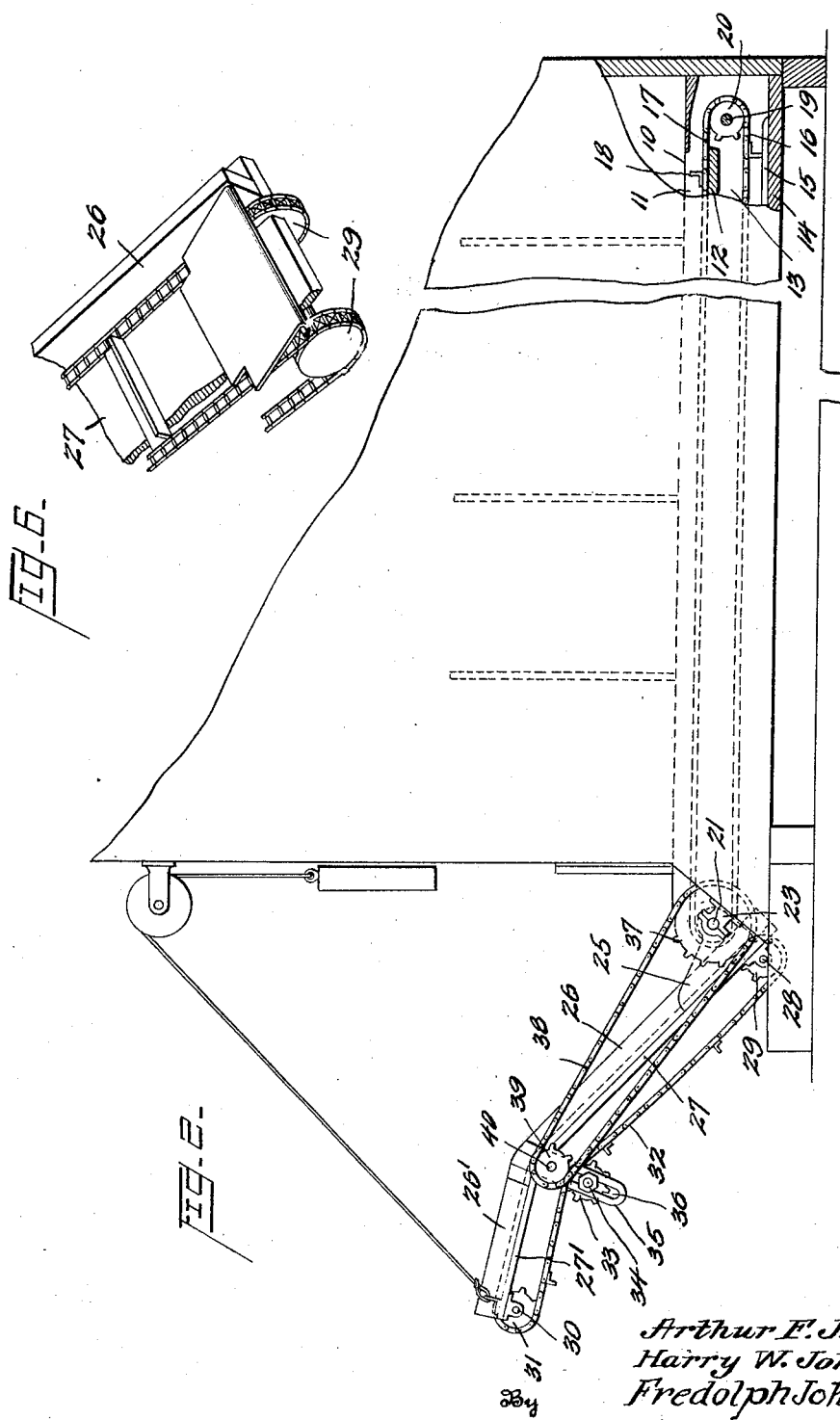

1,827,236

UNITED STATES PATENT OFFICE

FREDOLPH JOHNSON, HARRY W. JOHNSON, AND ARTHUR F. JOHNSON, OF LITTLE FALLS, MINNESOTA

LITTER REMOVER

Application filed August 12, 1927. Serial No. 212,546.

This invention relates to material handling devices and particularly to that class of material handling devices wherein stable litter is carried from the rear of stalls to the outside of the barn and loaded into a spreader or other vehicle to be taken away.

In the handling of litter from barns by conveyor means, it is necessary to not only provide for the mere removal of the litter but provision must be made so that the device will operate in all kinds of weather as, for example, in localities where the thermometer registers as low as 40° F. Provision must be made also for means for disposing of the litter after it has been removed from the delivery point at the barn wall.

The primary object of this invention is the provision of an improved means for removing litter from the rear of stalls and delivering it to the outside of the barn to be carried away by a spreader, truck or wagon.

Another object of this invention is the provision of a litter remover having a pivoted section maintaining an equal distance between the sections regardless of the relative angle.

Still another object of this invention is the provision of a litter remover having a chain drag construction which will have very little liability of freezing.

A still further object of this invention is the provision of a litter remover having a means between the sections which will prevent loss of material in the transfer between sections.

Another and still further object of this invention is the provision of a litter remover having a section pivoted on the same shaft with the rotating members of one end of another section.

Other and further objects of our invention will be apparent, to those skilled in the art, from a reading of the complete specification and claims.

Referring to the drawings wherein we have illustrated a preferred embodiment of our invention, Fig. 1 is a plan view, Fig. 2 is a side elevation showing portions of the barn broken away for clearness.

Fig. 3 is a longitudinal section on the line 3—3 of Fig. 1.

Fig. 4 is a fragmental sectional view on the line 4—4 of Fig. 1.

Fig. 5 is a detail view of the clutch holding device.

Fig. 6 is a detail view of the lower end of the adjustable conveyor.

Fig. 7 is a sectional view on the line 7—7 of Fig. 3.

10 designates the floor level of the barn where the cattle stalls are located side by side, each being perpendicular to and along side the gutter 11 shown in Fig. 4. At the bottom of the gutter 11 is a water-tight floor 12 which prevents the entry of water into the compartment 13 thereunderneath. On the floor 14 of the compartment 13, is a track 15 which supports the lower length of the endless traveling carrying member 16. This endless carrying member 16 is composed of a pair of chains 17 connected together at intervals by flights 18 preferably of a shape having a flat horizontal portion with an upright portion at the rear of the flat portion as shown in Fig. 3.

At one end of the gutter 11 is a shaft 19 carrying wheels 20. The carrying wheels 20 are preferably in the shape of sprockets and journaled upon the shafts 19. At the opposite end of the endless carrying member 16 is a drive shaft 21 upon which is mounted sprocket wheels 22. These sprocket wheels 22 are keyed to the shaft 21 and revolve therewith. The shaft 21 is suitably journaled in bearings 23 secured to the outside of the barn wall 24 as shown in Fig. 1.

On the shaft 21 are journaled hangers 25 which are secured to the sides of a second traveling carrying member having sides 26 and a bottom 27. At the outer end of the bottom 27 is an outer section 27' forming a continuation of the bottom 27. At the sides of the bottom 27' are sides 26' corresponding to the sides 26. At the lower end of the bottom 27 is journaled a shaft 28 upon which are journaled two sprockets 29, preferably freely. At the outer end of the bottom 27' is journaled a power shaft 30. Between the two side members 26' and on the shaft 30 are secured two sprocket wheels 31. An endless carrying member 32 is provided and is mounted to move over the bottom portions 27 and 27' and also over the sprockets 29 and 31. Tightener wheels 33 are provided on the lower side of the carrying member 32 and are carried by a shaft 34 hung on hangers 35. As shown in Fig. 3, a slot 36 is provided whereby the shaft 34 may be adjusted vertically to tighten the carrying member 32.

The construction of the carrying member 32 is similar to the construction of the carrying member 16 although it has been found in practice that the carrier 32 can be made of lighter construction, it being preferably operated at a higher speed.

In order to transmit power from the drive shaft 21 to the power shaft 30 to drive the carrier 32, we provide two sprocket chains and appropriate chains and sprockets. On the shaft 21 is a sprocket 37 which carries one end of a drive chain 38, the other end of which is carried by the sprocket 39 which is in turn carried by the shaft 40. The shaft 40 extends through the hangers 35 and carries at the end opposite the sprocket 39, a second sprocket 41. On the sprocket 41 is a chain 42 the other end of which is carried by the sprocket 43. This sprocket 43 is mounted to turn with the shaft 30 already described.

In practice, we have found that a convenient proportion of the sizes of the sprockets 39 and 37 is in the ratio of one to two, the sprockets 39, 41 and 43 all being of the same size.

On the shaft 21 is a sprocket 44 over which is driven a chain 45 by the sprocket 46. The sprocket 46 is provided with a suitable clutch member 47 and with the clutch member 47 freely revolves on the shaft 48 when the clutch is not in engagement. A complementary clutch member 49 is provided to coact with the clutch member 47 and is secured to the shaft 48.

An annular groove 50 is provided adjacent the sprocket 46 and is engaged by the jaws of a lever 51. This lever 51 is pivoted adjacent its middle and is moved by an operating rod 52. By operating the rod 52, the clutch members 47, 49 may be made to engage or disengage at will. A spring 53 normally tends to keep the clutch members 47 and 49 in engagement. Any suitable means may be used as a notch 54 in the rod 52 to hold the clutch members 47, 49 out of engagement. The notch 54 will be engaged with the detent 55 on the bearing support 23, as clearly shown in Fig. 5.

A gas engine or other motive power 56 is suitably operatively connected to the shaft 48 as by the silent chain 57 shown in Fig. 1.

It will thus be seen that we have provided a litter remover which will function under all conditions. Among the features accomplished is the supporting of the lower chain of the endless carrying member 16 by the edges of the flights 18 on the track 15. As already pointed out the floor 12 is watertight. However, if any moisture is carried by the flights 18 and the latter become frozen to the track 15, the edge of these flights will be immediately broken away upon the starting of the endless carrying member.

It is also noted that special advantages are obtained from the construction adjacent to and at the point of joining of the two carrying members. In normal use, the outer delivery carrier would be lowered to a position to deliver the litter to the truck, wagon or spreader. This action, due to its mounting on the shaft 21 would have a tendency to loosen up the parts if there was a tendency to be stuck by freezing and in addition it is to be observed that regardless of the position of this delivery carrier, the distance between the delivery and the gathering carrier 16 and the inner end of the delivery carrier always remains the same.

To catch the litter from the delivery end of the gathering carrier 16, we have provided a plate 57 which is pivoted in the sides 26 and is shaped to always normally rest upon the bottom 27 of the delivery carrier. This pivoted plate is in a position to catch the litter and prevent it from falling backwardly between the two carriers. As each flight passes the plate 57, the latter simply pivots and then drops back in position after the flight has passed.

It is to be understood that another row of stalls with its litter carrier can be connected to the same motor or drive shaft shown if needed.

While we have illustrated and described in detail an embodiment of our invention we desire to have it understood that we do not limit ourselves to the exact showing and that modifications and changes may be made without departing from the spirit of our invention and within the scope of the appended claims.

Having described our invention, what we claim is:—

1. A litter remover comprising a gutter, two movable endless carrying members, each carrying member comprising two chains and flights connecting the chains, one of the carrying members having an upper portion in the gutter and a lower portion below the gutter and means extending longitudinally of the carrier and between the chains and in position to receive and support the flights during movement beneath the gutter.

2. A litter remover comprising a waterproof gutter, two movable endless carrying members, each carrying member comprising two chains and flights connecting the chains, one of the carrying members having an upper portion in the gutter and a lower portion below the gutter and means extending longitudinally of the carrier and between the chains and in position to receive and support the flights during movement beneath the gutter.

3. A litter remover comprising a gutter, two endless carrying members, one of the carrying members having an upper traveling portion traveling in the gutter and a lower portion below the gutter, a shaft at one end of the gutter, drive means therefor, sprocket means on the shaft for causing movement of the carrying member when the shaft is rotated, supporting bearings for the other endless carrying member, journaled about the shaft and drive connections from the shaft to the second described carrying member.

4. A litter remover comprising a gutter, a movable endless carrying member including chains and flights connecting the chains and including an upper portion in the gutter and a lower portion below the gutter, the floor of the gutter extending substantially the whole length of the upper portion and in position to protect the lower portion from drippings and means extending longitudinally of the carrier and between the chains and in position to receive and support the flights during movement beneath the gutter.

In testimony whereof we hereunto affix our signatures.

FREDOLPH JOHNSON.
HARRY W. JOHNSON.
ARTHUR F. JOHNSON.